US012565542B2

(12) United States Patent
Mestach et al.

(10) Patent No.: US 12,565,542 B2
(45) Date of Patent: Mar. 3, 2026

(54) WATERBORNE COATING COMPOSITION

(71) Applicant: Allnex Netherlands B.V., Bergen Op Zoom (NL)

(72) Inventors: Dirk Mestach, Nijlen (BE); Silfredo Bohorquez, Rotterdam (NL); Jaap Akkerman, Goes (NL)

(73) Assignee: ALLNEX NETHERLANDS BV, Bergen Op Zoom (NL)

( * ) Notice: Subject to any disclaimer, the term of this patent is extended or adjusted under 35 U.S.C. 154(b) by 689 days.

(21) Appl. No.: 17/916,264

(22) PCT Filed: Apr. 2, 2021

(86) PCT No.: PCT/EP2021/058797
§ 371 (c)(1),
(2) Date: Sep. 30, 2022

(87) PCT Pub. No.: WO2021/204723
PCT Pub. Date: Oct. 14, 2021

(65) Prior Publication Data

US 2023/0142644 A1 May 11, 2023

(30) Foreign Application Priority Data

Apr. 9, 2020 (EP) .................................... 20169053

(51) Int. Cl.
*C08F 2/26* (2006.01)
*C08F 220/14* (2006.01)
(Continued)

(52) U.S. Cl.
CPC .............. *C08F 2/26* (2013.01); *C08F 220/14* (2013.01); *C08L 33/12* (2013.01); *C08L 39/06* (2013.01);
(Continued)

(58) Field of Classification Search
None
See application file for complete search history.

(56) References Cited

U.S. PATENT DOCUMENTS 6,872,789 B2 3/2005 Brinkhuis et al.
2001/0031826 A1 10/2001 Laubender et al.
(Continued)

FOREIGN PATENT DOCUMENTS

EP 0 136 025 4/1985
EP 0 593 151 4/1994
(Continued)

OTHER PUBLICATIONS

International Search Report (ISR) issued Jun. 23, 2021 in International (PCT) Application No. PCT/EP2021/058797.

*Primary Examiner* — Satya B Sastri
(74) *Attorney, Agent, or Firm* — Wenderoth, Lind & Ponack, L.L.P.

(57) ABSTRACT

The present invention generally relates to the field of cross-linkable aqueous vinyl polymer dispersions, to a coating composition comprising said cross-linkable aqueous vinyl polymer dispersions; to a paint formulation comprising said cross-linkable aqueous vinyl polymer dispersions; and to an article coated with the coating composition or the paint formulation. In particular, the present invention provides an aqueous vinyl polymer dispersion PD which comprises the following polymers: —1) an aqueous dispersion of a vinyl polymer P1 obtainable by free radical emulsion polymerization of a monomers mixture comprising: a) 5 to 20 wt % acid functional ethylenically unsaturated monomers M1 or precursors thereof; b) 5 to 25 wt % ethylenically unsaturated monomers M2 containing a polyethylene glycol or mono-alkoxy polyethylene glycol moiety; c) up to 90 wt % of non-ionic ethylenically unsaturated monomers M3 other than M1 or M2; d) 0 to 10 wt % ethylenically unsaturated monomers M4 with a functional group for cross-linking after film-formation; e) 0 to 10 wt % of at least one chain transfer agent CTA; where the sum of the wt. % of M1+M2+M3+M4+CTA=100 wt %; —2) an aqueous dispersion or solution of a vinyl polymer P2 obtainable by free radical copolymerization of: a) from 25 to 95 wt % of a ethylenically unsaturated monomers M5 selected from the group of N-vinyl amides with general structure (I) where $R_1$ and $R_2$ are alkyl from $C_1$ to $C_5$ and may be connected to form a ring-structure, preferably N-vinyl pyrrolidone or N-vinyl caprolactam; b) from 5 to 75 wt % of non-ionic ethylenically unsaturated monomers M3' other than M5; c) from 0 to 5 wt % of ethylenically unsaturated monomers M4' with a functional group for cross-linking after film-formation; d) from 0 to 10 wt % acid functional ethylenically unsaturated monomers M1' or precursors thereof; e) from 0 to 5 wt % of at least one chain transfer agent CTA'; where the sum of the wt. % of: M5+M3'+M4'+M1'+CTA'=100 wt %; —3) a film-forming vinyl polymer P3 under the form of an aqueous dispersion comprising: i) from 20 to 60 wt % of a water-soluble or water dispersible crosslinkable vinyl oligomer OL obtained by emulsion polymerizing a monomer mixture comprising: 1) at least one acid functional ethylenically unsaturated monomer M1"; 2) at least one ethylenically unsaturated monomer M4" with functionality for crosslinking upon film-formation, other than M1"; 3) at least one ethylenically unsaturated monomer M3" other than M1" and M2", and 5) optionally, at least one chain transfer agent CTA", and ii) from 40 to 80 wt % of a high molecular weight vinyl polymer P4 prepared by emulsion polymerizing, in the presence of the water-soluble or water-dispersible crosslinkable vinyl oligomer OL, a monomer mixture comprising: 1) optionally one acid functional ethylenically unsaturated monomer M1'"; 2) optionally one or more ethylenically unsaturated monomers M4'" with functionality for cross-linking upon film-formation, other than M1'"; 3) at least one ethylenically unsaturated monomer M3'" other than M1'" and MT' and 4) optionally, one or more multifunctional ethylenically unsaturated monomers for pre-crosslinking,
(Continued)

M5''', preferably in an amount less than 5 wt %, —Where the total weight of film-forming vinyl polymer P3=wt. % of the water-soluble or water dispersible crosslinkable vinyl oligomer OL+wt. % of the high molecular weight vinyl polymer P4=i)+ii)=100 wt % and—Where the total weight of the vinyl polymer in the aqueous vinyl polymer dispersion PD=wt. % of the vinyl polymer P1+wt. % of the vinyl polymer P2+wt. % of the film-forming vinyl polymer P3=100 wt %.

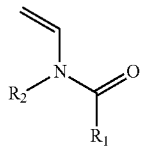

(I)

17 Claims, No Drawings

(51) Int. Cl.

| | |
|---|---|
| ***C08L 33/12*** | (2006.01) |
| ***C08L 39/06*** | (2006.01) |
| ***C09D 7/80*** | (2018.01) |
| ***C09D 133/12*** | (2006.01) |

(52) U.S. Cl.
CPC ............. *C09D 7/80* (2018.01); *C09D 133/12* (2013.01); *C08F 2800/20* (2013.01); *C08L 2201/54* (2013.01); *C08L 2205/03* (2013.01)

(56) References Cited

U.S. PATENT DOCUMENTS

| | | | | |
|---|---|---|---|---|
| 2007/0043156 | A1 | 2/2007 | Mestach et al. | |
| 2014/0005322 | A1* | 1/2014 | Akkerman ........... | C09D 133/14 524/522 |
| 2014/0039122 | A1 | 2/2014 | Mestach et al. | |
| 2016/0333199 | A1 | 11/2016 | Akkerman et al. | |
| 2020/0024460 | A1 | 1/2020 | Hearley | |
| 2020/0157375 | A1 | 5/2020 | Akkerman et al. | |

FOREIGN PATENT DOCUMENTS

| | | |
|---|---|---|
| WO | 2012/130817 | 10/2012 |
| WO | 2015/107163 | 7/2015 |

* cited by examiner

WATERBORNE COATING COMPOSITION

The present invention pertains to cross-linkable aqueous vinyl polymer dispersions, to a coating composition comprising said cross-linkable aqueous vinyl polymer dispersions; to a paint formulation comprising said cross-linkable aqueous vinyl polymer dispersions; and to an article coated with the coating composition or the paint formulation.

DESCRIPTION OF THE RELATED ART

Legislation on the emission of volatile compounds is driving the switch from solvent borne to waterborne coating compositions. However, waterborne coating compositions still need improvement to achieve, or to match, the advantageous properties of their solvent-borne counterparts. A particular problem with waterborne coating compositions is the short period of time in which a freshly applied layer of coating can be re-manipulated without leaving visible defects in the cured coating like brush marks, roller marks, spray dust (commonly known as 'overspray') or visible lines at joints between adjacent coating layers.

A layer of a coating composition freshly applied to a substrate is said to be "open" when it is still in a state where it can be manipulated during the drying without leaving substantial visible defects in the dried coating. The open time is the period of time between the point of first application of a coating layer up to the point where corrections can no longer be made in the wet paint film without leaving visible defects.

It is a longstanding desire to improve the open time of waterborne paints based on aqueous film-forming coating compositions. Film-forming polymers in aqueous coating compositions typically are meant to be polymers that have glass transition temperatures sufficiently low to form coherent films on a substrate at ambient use temperatures, preferably having a minimal film-forming temperature in a range between 0 and 60° C.

It is believed that longer open time can be achieved by using water-soluble additives or co-binders in the formulation of coatings. For example, water-soluble co-solvents such as alkylene glycols (e.g. ethylene glycol, propylene glycol, 2-methyl-2,4-pentanediol) are considered to have a beneficial influence on open time. Alternatively, water-soluble polymers, such as polyvinyl alcohol, polyethylene glycol, poly(meth)acrylamide, and poly 2-ethyl oxazoline have been suggested to be useful for extending the open time of waterborne coatings. However, it is a general problem of the known water-soluble polymer open time improvers that the resulting coatings exhibit poor water-resistance. This implicates in practice that only very low levels can be used, thus reducing the effectiveness of improving open time or wet edge time. Water-soluble additives also create a problem when the first paint layer needs to be over-coated by a second layer of the same paint, for example in order to provided sufficient hiding of the substrate. Generally speaking recoatability of these paints is poor.

EP 136025 B1 discloses paint formulations that include water soluble copolymers containing both ionic and non-ionic moieties. Even though these blends could improve the open time and brushability of decorative paints, neither relevant data nor claims to such applications are mentioned.

EP 0593151 B1 describes a method to enhance the open time of waterborne coatings. The method includes the blending of an acrylic latex containing a reacting functional group with a modifying amphiphilic-lower molecular compound containing a reactive group which is complimentary to the reacting groups of the polymer latex. The addition of the modifying compound indeed enhanced the open time of the reference paint prepared with only the acrylic latex. However, open time reached a maximum of only 15 minutes and no data about the open-time of the second layer and its recoatablity are mentioned.

US 2001/0031826A1 describes the use of an emulsion polymer for the formulation of high gloss paints with improved open time. The emulsion polymer was prepared using a mixture of (meth)acrylic monomers with polyalkylene oxide functional monomers. The open time for paints made with these copolymers is indeed remarkably higher than 20 minutes in some examples. Nevertheless, no data on the recoatability of the paints was presented.

WO 2012130817 A1 describes an aqueous composition made of a blend of two film forming polymeric dispersions, which presents extended open time for the first layer and excellent chemical resistance and blocking as compared to conventional commercial-trim paints. The first polymer dispersion contains groups for ambient crosslinking and carboxylic acid/poly ethylene oxide functionality. The second polymeric dispersion is from the group of polyurethanes, vinyl polymers or alkyds.

Despite the progress made in the art, there was mainly focus on the open time, and dry film performance of the first paint layer that is applied. However, trim and architectural paints are usually applied as multi-layer systems in order to obtain sufficient hiding of the substrate. Therefore, the open time during application of the second layer must be on the same level as for the first paint layer. WO 2015107163 A1 discloses a technology that allows the open time of the first paint layer to be 22-25 min. Nevertheless, this property is no longer present when the subsequent paint layer(s) are applied and the open time is reduced with about 30 to 50%. Also and the flow and levelling of the second applied layer of paint is poor. Therefore there is a need for waterborne coatings that have good open-time, flow and levelling in a paint applied in multiple-layers.

DETAILED DESCRIPTION OF THE INVENTION

The invention relates to aqueous polymer vinyl dispersions for use in the coating composition according to the invention. This aqueous vinyl polymer dispersion PD comprises the following polymers:

1) an aqueous dispersion of a vinyl polymer P1 obtainable by free radical emulsion polymerization of a monomers mixture comprising:

a) 5 to 20 wt % acid functional ethylenically unsaturated monomers M1 or precursors thereof;

b) 5 to 25 wt % ethylenically unsaturated monomers M2 containing a polyethylene glycol or monoalkoxy polyethylene glycol moiety;

c) up to 90 wt % of non-ionic ethylenically unsaturated monomers M3 other than M1 or M2, d) 0 to 10 wt % ethylenically unsaturated monomers M4 with a functional group for cross-linking after film-formation e) 0 to 10 wt % of at least one chain transfer agent CTA, where the sum of the wt. % of M1+M2+M3+M4+CTA=100 wt %;

2) an aqueous dispersion or solution of a vinyl polymer P2 obtainable by free radical copolymerization of:

a) from 25 to 95 wt % of a ethylenically unsaturated monomers M5 selected from the group of N-vinyl amides with general structure:

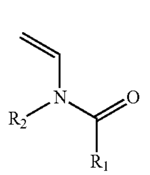

where $R_1$ and $R_2$ are alkyl from $C_1$ to $C_5$ and may be connected to form a ring-structure, preferably N-vinyl pyrrolidone or N-vinyl caprolactam;

b) from 5 to 75 wt % of non-ionic ethylenically unsaturated monomers M3';

c) from 0 to 5 wt % of ethylenically unsaturated monomers M4' with a functional group for cross-linking after film-formation;

d) from 0 to 10 wt % acid functional ethylenically unsaturated monomers M1' or precursors thereof;

e) from 0 to 5 wt % of at least one chain transfer agent CTA';

where the sum of the wt. % of M5+M3'+M4'+M1'+CTA'=100 wt %;

3) a film-forming vinyl polymer P3 under the form of an aqueous dispersion comprising:

i) from 20 to 60 wt % of a water-soluble or water dispersible crosslinkable vinyl oligomer OL obtained by emulsion polymerizing of a monomer mixture comprising:

1) at least one acid functional ethylenically unsaturated monomer M1", 2) at least one ethylenically unsaturated monomer M4" with functionality for crosslinking upon film-formation, other than M1", 3) at least one ethylenically unsaturated monomer M3" other than M1" and M2", and 5) optionally, at least one chain transfer agent CTA", and ii) from 40 to 80 wt % of a high molecular weight vinyl polymer P4 prepared by emulsion polymerizing, in the presence of the water-soluble or water-dispersible crosslinkable vinyl oligomer OL, a monomer mixture comprising:

1) optionally one acid functional ethylenically unsaturated monomer M1'", 2) optionally one or more ethylenically unsaturated monomers M4'" with functionality for crosslinking upon film-formation, other than M1'", 3) at least one ethylenically unsaturated monomer M3'" other than M1" and M2'" and 4) optionally, one or more multifunctional ethylenically unsaturated monomers for pre-crosslinking, M5'", preferably in an amount less than 5 wt %;

Where the total weight of the film-forming vinyl polymer P3=wt. % of the water-soluble or water dispersible crosslinkable vinyl oligomer OL+wt % of the high molecular weight vinyl polymer P4=i)+ii)=100 wt % and Where the total weight of the vinyl polymer in the aqueous vinyl polymer dispersion PD=wt. % of the vinyl polymer P1+wt. % of the vinyl polymer P2+wt. % of the film-forming vinyl polymer P3=100 wt %.

The vinyl polymers P1, P2 and P3 can be synthesized separately and can be combined by means of blending their respective aqueous dispersions to make up polymer dispersion PD. The ratio of vinyl polymers P1, P2 to P3 is (1:1:98) to (65:15:20), preferably (9:1:90) to (50:10:40), more preferably (25:1.5:73.5) to (35:4.5:60.5) and most preferably from (27:2:70) to (32:4:65).

The aqueous vinyl polymer dispersion PD consists of from 30 wt % to 60 wt % of the vinyl polymers P1+P2+P3, the remainder being, amongst others water, surfactants, a neutralizing base and a biocide.

By “ethylenically unsaturated monomer” is meant in the present invention a monomer having at least one carbon-carbon double bond which can undergo radical polymerization.

The prefix “(meth)acryl” when used to name compounds of the present invention encompasses both “acryl” and “methacryl” and refers to compounds comprising at least one CH2═CHCOO— group or CH2═C(CH3)COO— group, as well as mixtures thereof and mixtures of such compounds.

By “vinyl oligomer” is meant a low molecular weight polymer that is obtained by means of the radical polymerization of ethylenically unsaturated monomers.

By “vinyl polymer” is meant a polymer derived from vinyl monomers that contain a carbon-carbon double bond.

By “where the sum of the wt. % of M1+M2+M3+M4+CTA=100 wt %”: it means that the vinyl polymer P1 consists essentially of monomers M1, M2, M3, M4 and at least one chain transfer agent CTA as defined above. Thus, the total weight of the vinyl polymer P1 corresponds to the sum of the weight percentages of monomers M1, M2, M3, M4 and at least one chain transfer agent CTA.

By “where the sum of the wt. % of M5+M3'+M4'+M1'+CTA'=100 wt %;”: it means that the vinyl polymer P2 consists essentially of monomers M5, M3', M4', M1' and at least one chain transfer agent CTA'. Thus, the total weight of the vinyl polymer P2 corresponds to the sum of the weight percentages of monomers M5, M3', M4', M1' and at least one chain transfer agent CTA'.

By “the total weight of film-forming vinyl polymer P3=wt. % of the water-soluble or water dispersible crosslinkable vinyl oligomer OL+wt % of the high molecular weight vinyl polymer P4=i)+ii)=100 wt %”: it means that the film-forming vinyl polymer P3 consists essentially of a water-soluble or water dispersible crosslinkable vinyl oligomer OL and a high molecular weight vinyl polymer P4. Thus, the total weight of the film-forming vinyl polymer P3 corresponds to the sum of the weight percentages of the water-soluble or water dispersible crosslinkable vinyl oligomer OL and the high molecular weight vinyl polymer P4.

By “Where the total weight of the vinyl polymer in the aqueous vinyl polymer dispersion PD=wt. % of the vinyl polymer P1+wt. % of the vinyl polymer P2+wt. % of the film-forming vinyl polymer P3=100 wt %”, it means that this vinyl polymer consists essentially of a vinyl polymer P1, a vinyl polymer P2 and a film-forming vinyl polymer P3. Accordingly, the total weight of the vinyl polymer in the aqueous vinyl polymer dispersion PD corresponds to the sum of the weight percentages of the vinyl polymer P1, the vinyl polymer P2 and the film-forming vinyl polymer P3. Thus, the aqueous vinyl polymer dispersion PD consists essentially of an aqueous dispersion of a vinyl polymer P1, an aqueous dispersion or solution of a vinyl polymer P2 and an aqueous dispersion of a film-forming vinyl polymer P3.

The process of emulsion polymerization is described in “Chemistry and Technology of Emulsion Polymerisation”, Editor A. van Herk, (2005), Blackwell Publishing Ltd.

Definition of the Monomers

Monomers M1, M1" and M'"

Acid functional ethylenically unsaturated monomers M1', M1" and M1'" can, each independently, be selected from the group of carboxylic acid functional monomers or its precursors such as acrylic acid, methacrylic acid, maleic acid or its half-esters, fumaric acid or its half esters, and itaconic acid or its half esters. These monomers may be produced from petrochemical feedstock. Alternatively they may be derived from renewable feedstock. Bio-based acrylic acid can be produced from glycerol or hydroxypropionic acid, hydroxypropionic acid derivatives, or mixtures thereof. Itaconic acid is obtained by fermentation of sugars and bio-based methacrylic acid can be derived from itaconic acid.

Other acid-functional, non-carboxylic groups-containing monomers can for example be sulphate or sulphonic monomers. As non-limiting examples may be mentioned 2-acrylamido-2-methylpropane sulphonic acid or the alkali, ammonia or amine salt thereof and the sodium salt of the adduct of allylglycidyl ether to sodium bisulphite, 2-sulfoethyl methacrylate or 1-(allyloxy)-2-hydroxypropane-1-sulfonic acid. Also phosphate or phosphonate functional monomers can be used. Non-limiting examples of such monomers are monoacryloxyethyl phosphate, Sipomer® PAM-100 and Sipomer® PAM-200 (both from Solvay), 10-methacryloyloxydecyl dihydrogen phosphate (Kuraray), dimethyl (2-methacryloyloxyethyl) phosphonate and dimethyl (2-methacryloyl oxypropyl) phosphonate or Ethyl 2-[4-(dihydroxy phosphoryl)-2-oxabutyl] acrylate.

Monomers M2, M2', M2", and M2'"

The polyethylene oxide containing ethylenically unsaturated monomers M2, M2', M2" and M2'" preferably comprise monomers of the general formula R3-O—(CH2-CH2-O)n-R2, wherein R3 is acryl or methacryl; R2 is H or alkyl, preferably comprising from 1 to 4 carbon atoms, n is an integer from 1 to 35, preferably more preferably 2 to 20 and most preferably 3 to 15. The polyethylene oxide ethylenically unsaturated monomers preferably comprise from 2 to 50 ethylene oxide units, more preferably from 2 to 20, and most preferably from 2 to 15. The monomers are preferably polyethylene glycol (meth) acrylate monomers or mono methoxy (meth) acrylate monomers. Suitable examples of polyethylene oxide ethylenically unsaturated monomers ii) are methoxy polyethylene glycol 550 methacrylate and methoxy polyethylene glycol 350 methacrylate. Examples are Visiomer® ETMA, Visiomer® MPEG550MA (available from Evonik), Bisomer® S20W, Bisomer® PEA6 (available from GEO Specialty Chemicals).

Monomers M3, M3', M3" and M3'"

The non-ionic ethylenically unsaturated monomers M3, M3', M3", M3'" and M3"" preferably comprise styrene and styrene derivatives such as alpha-methyl styrene, t-butylstyrene, vinyl toluene, o-, m-, and p-methylstyrene, o-, m-, and p-ethylstyrene, alkyl esters of (meth)acrylic acid, vinyl esters, vinyl monomers containing hydroxyl groups; Preferred monomers include esters of acrylic and methacrylic acid such as n-butyl (meth) acrylate, methyl (meth) acrylate, ethyl (meth) acrylate, 2-ethylhexyl (meth) acrylate, lauryl (meth)acrylate, cycloalkyl (meth) acrylates, e.g., and cyclohexyl (meth) acrylate. Esters of itaconic acid such as dimethyl and di-butyl itaconate. These monomers may be produced from petrochemical feedstock. Alternatively they may be derived from renewable feedstock such as bio-based acrylic and methacrylic acid. The alkanols used in the (trans)esterification can also be bio-derived. Non-limiting examples of such monomers are Visiomer® Terra C13-MA, Visiomer® Terra C17.4-MA, n-octyl acrylate and isobornyl (meth) acrylate. Also dienes such as 1,3-butadiene or isoprene; or mixtures thereof. Also, vinyl esters, such as vinyl acetate, vinyl alkanoate or their derivatives or mixtures thereof can be used in the monomer composition. Nitriles, such as (meth)acrylonitrile can also be used.

Monomers M4, M4', M4", and M4'"

Monomers M4, M4', M4", M4'" and M4"", having functional groups other than acidic groups, can be used for crosslinking after film-formation. M4, M4', M4", M4'" and M4"" can be the same or different. Examples of these monomers include hydroxy-functional monomers such as hydroxyethyl (meth) acrylate, hydroxypropyl (meth) acrylate, hydroxybutyl (meth) acrylate, also monomers having latent hydroxy groups such as glycidyl methacrylate. Hydroxy-functional groups can be cross-linked with polyisocyanates at ambient to slightly elevated temperature. Further examples include derivatives of (meth) acrylamide such as N-methylol (meth) acrylamide. Other examples of monomers are those that contain a carbonyl group such as acrolein, methacrolein, crotonaldehyde, 4-vinylbenzaldehyde, vinyl alkyl ketones of 4 to 7 carbon atoms such as vinyl methyl ketone. Further examples include acrylamido pivalaldehyde, methacrylamido pivalaldehyde, 3-acrylamidomethyl-anisaldehyde, diacetone acrylate and diacetone methacrylate, and keto-containing amides such as diacetone acrylamide. Monomers having an acetoacetoxy functional group can also be used. Examples of such monomers are acetoacetoxyethyl methacrylate, acetoacetoxyethyl acrylate, acetoacetoxypropyl acrylate, allyl acetoacetate, and acetoacetoxybutyl acrylate. The preferred functional groups of monomer M4, respectively M4', M4", M4'" and M4"", are preferably carbonyl or acetoacetate groups.

In a particularly preferred embodiment the monomer M4, M4', M4", M4'" and, respectively M4"", are selected from acetoacetoxyethyl methacrylate and diacetone acrylamide, or mixtures thereof. Crosslinkers for use in combination with the above functional groups are known to those skilled in the art and comprise di or poly amines and di-or poly carboxylic acid hydrazides. Crosslinking can occur at ambient or slightly elevated temperature. The crosslinker may be already incorporated in the dispersions of polymers P1, P2 or P3 or can be added at a later stage.

Monomers M5

Monomers M5 can be, each independently, selected from the group of N-vinyl amides, with general structure:

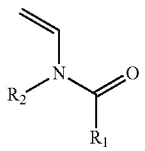

where $R_1$ and $R_2$ are alkyl from $C_1$ to $C_5$ and may be connected to form a ring-structure, preferably N-vinyl pyrrolidone or N-vinyl caprolactam.

Chain transfer agents CTA, CTA' and CTA"

Chain transfer agents CTA, CTA', CTA" are used to control the molecular weight of polymers P1, P2 and OL. Exemplary chain transfer agents are butyl mercaptan, mercaptopropionic acid, 2-ethylhexyl mercaptopropionate, n-dodecylmercaptan, t-dodecylmercaptan, n-butyl mercaptopropionate, 2-mercapto ethanol, octyl mercaptan, isodecyl mercaptan, octadecyl mercaptan, mercaptoacetic acid, allyl mercaptopropionate, allyl mercaptoacetate, crotyl mercaptopropionate, crotyl mercaptoacetate. Other, non-sulfur based chain transfer agent include halogenated hydrocarbons or catalytic chain transfer agents. Also alpha-methyl styrene dimer or oligomers of alpha-methyl styrene dimer can be used. Yet another method to synthesize polymer with a well-defined molecular weight is the use of diarylethene. A commonly used diarylethene includes diphenylethene.

Definition of the Vinyl Polymers P1, P2 and P3

Vinyl Polymer P1

Vinyl polymer P1 is obtainable by free radical aqueous emulsion polymerization in the presence of at least one free-radical initiator and at least one surfactant, optionally a copolymerizable surfactant, comprising a free radically reactive double bond.

Vinyl polymer P1 has a number average molecular weight, Mn, of from 2,000 to 120,000 g/mole, but preferably from 4,000 to 12,000 and most preferably 5,000 to 10,000. The weight average molecular weight (Mw) is preferably from 8,000 to 50,000 and most preferably 10,000 to 25,000. The molecular weight and molecular weight distribution was determined using size exclusion chromatography (SEC) using THF and 2% acetic acid as an eluent. Vinyl polymer P1 has a preferred polydispersity—as defined by the ratio of Mn/Mw—of 1.2 to 3.0, preferably 1.5 to 2.5. Vinyl polymer P1 contains 5 to 25 wt %, preferably 7 to 20 wt % and most preferably 9 to 15 wt % of polyethylene oxide ethylenically unsaturated monomers M2. Vinyl polymer P1 preferably has an acid value of 30 to 150 mg KOH/g as determined by ISO 3682. When aqueous emulsion polymerization is used polymer vinyl polymer P1 is obtained in the form of a polymer dispersion wherein the acid functional groups of the polymer are neutralized to an $\alpha$ value of from 0.05 to 0.70, preferably 0.10 to 0.25 and the aqueous dispersion of P1 has a pH of from 6.0 to 8.0, most preferably 6.5 to 7.5.

According to one embodiment, the vinyl polymer P1 has a number average molecular weight of from 2,000 to 120,000 g/mole determined by size exclusion chromatography using tetrahydrofuran and 2% acetic acid as eluent and using polystyrene standards, an acid value of from 30 to 150 mg KOH/g as determined by ISO 3682 and from 5 to 25 wt % of ethylenically unsaturated monomers M2 which is selected from the group consisting of a polyethylene oxide and monoalkoxy polyethyleneglycol (meth)acrylates compared to the total weight of the polymer P1.

Vinyl Polymer P2

Vinyl polymer P2 is an addition polymer that can be made by free-radical copolymerization techniques known in the art at atmospheric or elevated pressures at temperatures ranging between 0 and 200° C. It is preferred that vinyl Polymer P2 is a random copolymer. Block-copolymer or gradient copolymers wherein the pendant groups from monomers A are not uniformly distributed in the second polymer are not preferred as they are suspected to not form water-soluble substantially Newtonian solutions. Preferably vinyl polymer P2 is made by solution polymerization in an organic solvent that can easily be removed by means of distillation such as for example methyl ethyl ketone, acetone or iso-propanol or in a water-miscible solvent such as butyl glycol, diethylene glycol mono butyl ether or diethylene glycol mono ethyl ether.

Vinyl Polymer P2 generally has a weight average molecular weight Mw from 1,000 to 50,000, preferably from 2,000 to 40,000, more preferably 4,000 to 25,000 and most preferably from 8,000 to 12,500 gr/mole (determined by gel permeation chromatography using hexafluoro-iso-propanol as eluent and using poly(methyl methacrylate) standards for the calibration curve.

Vinyl polymer P2 preferably has a glass transition temperature Tg of from −30 to 180° C. Preferably, the Tg is at least 0° C., preferably at least 20° C., more preferably at least 35° C., and most preferably at least 45° C. Good results were obtained with Tg even above 60, 70, 80 and more than 90 and 100° C. Preferably the second polymer has a Tg between 0 to 180° C.

As described above, the vinyl polymer P2 has functional groups that are non-ionic but hydrophilic, arising from monomers M5 that provide water solubility.

In view of the envisaged coating properties it is preferred that at least 80, preferably 90 or even 95% of monomers M3' in vinyl polymer P2 have a monomer Tg lower than 120, preferably lower than 100, 50 or 20 and more preferably less than −10° C.

Vinyl polymer P2 further comprises 0-5 wt % of crosslinking monomers M4' different from monomers M1' and M2'. Effective amounts of monomer M3' range between 5 to 75 wt %.

Vinyl polymer P2 further comprises 0-5 wt % of chain transfer agents CTA'.

In a most preferred embodiment, vinyl polymer P2 is a copolymer of N-vinyl pyrrolidone and ethyl acrylate. Also a copolymer of N-vinyl caprolactam and ethyl acrylate is preferred.

A Film-Forming Vinyl Polymer P3

Vinyl polymer P3 is a film-forming polymer that is obtained by polymerizing a vinyl polymer P4 in the presence of a water-soluble or water dispersible vinyl oligomer OL.

A Water-Soluble or Water Dispersible Crosslinkable Vinyl Oligomer OL

The water-soluble or water dispersible crosslinkable vinyl oligomer OL is usually an acid-functional oligomer built from monomers M1", M3" and M4" and chain transfer agent CTA". Said oligomer preferably has a number average molecular weight Mn within the range of from 500 g/mole to 50,000 g/mole, more preferably 2,500 g/mole to 25,000 g/mole and most preferably 5,000 g/mole to 15,000 g/mole. The number and weight average molecular weights (Mn and Mw) of the oligomer may be determined by using gel permeation chromatography using a polymer, such as polystyrene, of known molecular weight as a standard and THF containing 2% acetic acid as an eluent. The crosslinkable vinyl oligomer OL preferably has a glass transition temperature within the range of 10 to 150° C., more preferably 20 to 125° C. and most preferably 25 to 115° C.

The Tg of an oligomer OL herein stands for the calculated glass transition temperature and is well known to be the temperature at which a polymer changes from a glassy, brittle state to a rubbery state. Tg values may be calculated using the well-known Fox equation (T. G. Fox, Bull. Am. Phys. Soc. 1, 123 (1956)), which is well known in the art, and is represented by the formula:

$$1/Tg=W1/Tg(1)+W2/Tg(2)+W3/Tg(3)+$$

wherein W1, W2, W3, etcetera, are the weight fractions of the comonomers (1), (2), and (3), (etcetera), and Tg(1), Tg(2), Tg(3) are the glass transition temperatures of their respective homopolymers. Glass transition values for homopolymers given in the Polymer Handbook, 4th edition (editors: J. Brandrup, E. H. Immergut, E. A. Grulke, John Wiley & Sons, Inc. 1999) are used to perform the calculation. The calculated Tg in degrees Kelvin may be readily converted to degrees Celsius.

The vinyl oligomer OL preferably has an acid number of at least 45 mg KOH/g, more preferably at least 50 mg KOH/g and most preferably at least 55 mg KOH/g.

Methods to influence the molecular weight in emulsion polymerization in order to achieve the desired number average molecular weight are well known to those skilled in the art. Molecular weight control of the oligomer may be provided by using chain-transfer agents such as mercaptans and halogenated hydrocarbons. Suitable mercaptans include as n-dodecyl mercaptan, n-octyl mercaptan, t-dodecyl mercaptan, 2-mercapto ethanol, iso-octyl thioglycolurate, C2 to C8 mercapto carboxylic acids and esters thereof such as 3-mercaptopropionic acid and 2-mercaptopropionic acid.

The crosslinkable vinyl oligomer OL may be prepared by any known technique and may include directly synthesizing the oligomer in an aqueous process, i.e. in the presence of water (for example by emulsion polymerization, suspension polymerization, micro-suspension polymerization or mini emulsion polymerization), or by solution polymerization where the solvent may be water or any organic solvent that is miscible with water or that is removed by distillation after the oligomer is transferred to water. When the oligomer is a macro-monomer, it may be prepared by a number of processes including but not limited to the use of reversible addition fragmentation (RAFT) agents, by the use of catalytic chain transfer agents such as cobalt-chain transfer. Also alpha-methyl styrene dimer or oligomers of alpha-methyl styrene dimer can be used as explained in US 2007/0043156 A1 and U.S. Pat. No. 6,872,789. Yet another method to synthesize polymers with a well-defined molecular weight is the use of diarylethene such as diphenylethene, or high temperature processes.

Preferably the vinyl oligomer OL is prepared by solution polymerization, emulsion polymerization or suspension polymerization. Preferably the oligomer is prepared by an aqueous process. Preferably the continuous phase of the aqueous process comprises >50 weight %, more preferably >80 weight % and most preferably >95 weight % of water.

Most preferably the vinyl oligomer OL is prepared by an aqueous free radical emulsion polymerization process.

The free radical polymerization may be carried out as a batch or as a semi-continuous polymerization process.

A free-radical emulsion polymerization will usually require the use of free-radical-yielding initiator to initiate the polymerization. Suitable free-radical-yielding initiators include inorganic peroxides such as K, Na or ammonium persulphate, hydrogen peroxide, or percarbonates; organic peroxides, such as acyl peroxides including e.g. benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as Na or K pyrosulphite or bisulphite, Bruggolite® FF6 (tradename from L. Brüggemann GmbH & Co. KG) and iso-ascorbic acid. Metal compounds such as Fe. EDTA (EDTA is ethylene diamine tetra acetate) may also be used as part of the redox initiator system. Azo functional initiators may also be used such as azobis(isobutyronitrile), 2,2'-azobis(2-methyl butane nitrile) (ANBN); and 4,4'-azobis(4-cyanovaleric acid). It is possible to use an initiator system that partitions between the aqueous and organic phases, e.g. a combination of t-butyl hydroperoxide, iso-ascorbic acid or Bruggolite® FF6 and Fe. EDTA. The amount of initiator or initiator system to use is conventional, e.g. within the range 0.05 to 6 weight % based on the total vinyl monomer(s) used. Preferred initiators for preparing the crosslinkable oligomer include ammonium persulphates, sodium persulphates, potassium persulphates, azobis(isobutyronitrile) and/or 4,4'-azobis(4-cyanovaleric acid). Most preferred initiators for preparing the crosslinkable oligomer include redox systems and persulphates as described above. A further amount of initiator may optionally be added at the end of the polymerization process to assist the removal of any residual vinyl monomers.

If the crosslinkable vinyl oligomer OL is made by means of emulsion polymerization, surfactants can be utilized in order to assist in the dispersion or the emulsification of the vinyl copolymer in water (even if it is self-dispersible). Suitable surfactants are ionic or non-ionic surfactants. Examples of anionic emulsifiers are: potassium laurate, potassium stearate, potassium oleate, sodium decyl sulphate, sodium dodecyl sulphate, and sodium rosinate. Examples of non-ionic emulsifiers are: linear and branched alkyl and alkylaryl polyethylene glycol ethers and thioethers and linear and branched alkyl and alkylaryl polypropylene glycol ethers and thioethers, alkylphenoxypoly(ethylenoxy) ethanols such as the adduct of 1 mole of nonylphenol to 5-50 moles of ethylene oxide, or the alkali salt or ammonium salt of the sulphate or the phosphate of said adduct.

Also surfactants containing an olefinicaly unsaturated group that can participate in a free radical polymerization can be used. Suitable polymerizable surfactants include hemi-esters of maleic anhydride of the formula M+. OOC—CH═CHCOOR wherein R is C6 to C22 alkyl and M+ is Na+, K+, Li+, NH4+, or a protonated or quaternary amine. Polyoxyethylene alkylphenyl ethers with an ethylenically unsaturated bond sold under the tradename Noigen® RN (ex. Montello, Inc.) such as NOIGEN™ RN-10, NOIGEN™ RN-20, NOIGEN™ RN-30, NOIGEN™ RN-40, and NOIGEN™ RN-5065 or the sulphate thereof sold under the tradename Hitenol® BC (ex Montello, Inc.) such as HITENOL® BC-10, HITENOL® BC-1025, HITENOL® BC-20, HITENOL® BC-2020, HITENOL® BC-30. MAXEMUL® 6106 (available from Croda), which has both phosphonate ester and ethoxy hydrophilicity, a nominal C18 alkyl chain with an acrylate reactive group. Other representative reactive surfactants with phosphate ester functionalities suitable for such reactions include, but are not limited to, MAXEMUL® 6112, MAXEMUL® 5011, MAXEMUL® 5010 (all available from Croda Industrial Specialties). Alternative reactive surfactants suitable for use with various embodiments of the present invention include sodium allyloxy hydroxypropyl sulphonate (available from Solvay as SIPOMER® COPS-1), ADEKA REASOAP® SR/ER series such as ADEKA REASOAP® ER-10, ER-20, ER-30 and ER-40, Akeda Reasoap SR-10, SR-20, SR-30 (all available from Asahi Denka Co., Ltd.) and allylsulphosuccinate derivatives (such as TREM® LT-40 (available from BASF)).

The amount of surfactant used in the synthesis of the oligomer is preferably 0 to 15 weight %, more preferably 0 to 8 weight %, still more preferably 0 to 5 weight %, especially 0.1 to 3 weight %

High Molecular Weight Vinyl Polymer P4

Preferably the vinyl polymer P4 is prepared in an aqueous process in the presence of the crosslinkable vinyl oligomer OL. Prior to the polymerization of vinyl polymer P4 the crosslinkable vinyl oligomer may be partially or completely solubilized. Most preferably the vinyl polymer P4 is prepared by an aqueous emulsion polymerization process.

The process for preparing the vinyl polymer P4 may be carried out in a number of modes including but not limited to polymerizing all of the vinyl oligomer OL and monomers M3''' and, optionally M1''' and/or M2''' and/or M4''', in one batch, pre-charging the solubilized or partially solubilized vinyl oligomer OL to a reactor and subsequently feeding in the monomers in one or more stages and/or using a gradient feeding technique (or vice versa), feeding both oligomer OL and monomers to a reactor (optionally pre-charged with some oligomer), preparing a vinyl polymer by feeding the monomers to the oligomer which is simultaneously fed into a reactor (optionally pre-charged with some vinyl oligomer) or continuously feeding a mixture of vinyl oligomer and monomers into a reactor.

Preferably the free-radical polymerization to obtain vinyl polymer P4 is effected by heating the reactor contents to a temperature in the range of from 30° C. to 100° C. and more preferably in the range of from 50° C. to 90° C.

Vinyl polymer P4 has a glass transition temperature between −70° C. and 50° C., more usually from −25° C. to 40° C. and should be at least 25° C., more preferably at least 40° C. below the Tg of the vinyl oligomer OL. The weight average molecular weight of vinyl polymer P4 should at least be higher than 60,000 g/mole, preferably higher than 100,000 g/mole.

The film-forming vinyl polymer P3 comprising the oligomer OL and polymer P4 is preferably under the form of an aqueous polymer dispersion.

Vinyl polymer P3 comprises from 20 to 60 wt % vinyl oligomer OL, preferably from 25 to 55 wt % vinyl oligomer OL and most preferably from 25 to 52.5 wt % vinyl oligomer OL.

The solids content of the aqueous dispersion of vinyl polymer P3 is preferably within the range of from 20 to 60 wt % and most preferably within the range of from 30 to 50 wt %.

Initiators

A free-radical polymerization will require the use of free-radical-yielding initiators to initiate the polymerization. Suitable free-radical-yielding initiators include inorganic peroxides such as potassium-, sodium- or ammonium persulphate, hydrogen peroxide, or percarbonates; organic peroxides, such as acyl peroxides including e.g. benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as sodium- or potassium pyrosulphite or bisulphite, sodium formaldehyde sulfoxylate and iso-ascorbic acid. Also non-formaldehyde releasing reducing agents such as Bruggolite® FF6 can be used. Metal compounds such as Fe. EDTA (EDTA is ethylene diamine tetra acetate) may also be used as part of the redox initiator system. Azo functional initiators may also be used such as azobis(isobutyronitrile), 2,2'-azobis(2-methyl butane nitrile) (ANBN); and 4,4'-azobis(4-cyanovaleric acid). It is possible to use an initiator system that partitions between the aqueous and organic phases, e.g. a combination of t-butyl hydroperoxide, iso-ascorbic acid and Fe. EDTA. The amount of initiator or initiator system to use is conventional, e.g. within the range 0.05 to 6 wt % based on the total vinyl monomer(s) used. Preferred initiators for preparing the vinyl polymers P1, P3 and P4 and vinyl oligomer OL include ammonium persulphates, sodium persulphates, potassium persulphates, azobis(isobutyronitrile) and/or 4,4'-azobis(4-cyanovaleric acid). A further amount of initiator may optionally be added at the end of the polymerization process to assist the removal of any residual vinyl monomers.

Surfactants

When the free radical polymerization to synthesize P1 and P3 is carried out as an emulsion polymerization, surfactants have to be used. Suitable surfactants are ionic or non-ionic surfactants. Examples of anionic emulsifiers are: potassium laurate, potassium stearate, potassium oleate, sodium decyl sulphate, sodium dodecyl sulphate, and sodium rosinate. Examples of non-ionic emulsifiers are: linear and branched alkyl and alkylaryl polyethylene glycol ethers and thioethers and linear and branched alkyl and alkylaryl polypropylene glycol ethers and thioethers, alkylphenoxypoly(ethylenoxy) ethanols such as the adduct of 1 mole of nonylphenol to 5-50 moles of ethylene oxide, or the alkali salt or ammonium salt of the sulphate or the phosphate of said adduct.

Also surfactants containing an olefinicaly unsaturated group that can participate in a free radical polymerization can be used. Suitable polymerizable surfactants include hemi-esters of maleic anhydride of the formula M+-OOC—CH═CHCOOR wherein R is C6 to C22 alkyl and M+ is Na+, K+, Li+, NH4+, or a protonated or quaternary amine. Polyoxyethylene alkylphenyl ethers with an ethylenically unsaturated bond sold under the tradename Noigen® RN (ex. Montello, Inc.) such as NOIGEN® RN-10, NOIGEN® RN-20, NOIGEN® RN-30, NOIGEN® RN-40, and NOIGEN® RN-5065 or the sulphate thereof sold under the tradename Hitenol® BC (ex Montello, Inc.) such as HITENOL® BC-10, HITENOL® BC-1025, HITENOL® BC-20, HITENOL® BC-2020, HITENOL® BC-30. MAXEMUL™ 6106 (available from Uniquema), which has both phosphonate ester and ethoxy hydrophilicity, a nominal C18 alkyl chain with an acrylate reactive group. Other representative reactive surfactants with phosphate ester functionalities suitable for such reactions include, but are not limited to, MAXEMUL® 6112, MAXEMUL® 5011, MAXEMUL® 5010 (all available from Croda Industrial Specialties). Alternative reactive surfactants suitable for use with various embodiments of the present invention include sodium allyloxy hydroxypropyl sulphonate (available from Solvay as SIPOMER® COPS-1), ADEKA REASOAP® SR/ER series such as ADEKA REASOAP® ER-10, ER-20, ER-30 and ER-40, Akeda Reasoap® SR-10, SR-20, SR-30 (all available from Asahi Denka Co., Ltd.) and allylsulphosuccinate derivatives (such as TREM® LT-40 (available from BASF)).

The present invention also refers to a coating composition COA comprising the aqueous vinyl polymer dispersion PD.

The coating composition COA can have a pH between 2.0 to 9.0, preferably 4.5 to 8.5, most preferably 7.5 to 8.0. The coating composition COA described above can preferably be formulated to a paint by adding the usual paint additives. Such composition can still be referred to as a coating composition. The coating composition COA may further comprise one or more organic solvents that aid film-formation, a pigment (organic or inorganic) and/or other additives and fillers known in the art. When an organic solvent is used, water miscible solvents are preferred. The amount of organic solvent shall be chosen in such a way to provide a coating composition with a low volatile organic content (VOC), and preferably comprises less than 50 g/litre, preferably less than 30 g/litre coating composition, including water of volatile organic compounds, as calculated by ISO method 11890-2 in the ready to use form.

According to one embodiment, the coating composition COA comprising the aqueous vinyl polymer dispersion PD may further comprise at least one or more conventional ingredients selected from pigments, dyes, emulsifiers, surfactants, plasticizers, thickeners, heat stabilizers, levelling agents, anti-cratering agents, fillers, sedimentation inhibitors, UV absorbers, antioxidants, drier salts, organic co-solvents, wetting agents and the like, or mixtures thereof.

According to another embodiment, the coating composition COA may also comprise one or more of coating additives including, but are not limited to, levelling, rheology, anti-block, and flow control agents such as silicones, fluorocarbons, urethanes, or cellulosic; extenders; flatting agents; pigment wetting and dispersing agents and surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; plasticizers; reactive plasticizers; drying agents; catalysts; or coalescing agents. The invention also relates to a paint composition comprising the coating composition and 1-70 wt % pigment or filler. Preferably the pigment used is rutile titanium dioxide, most preferably with an oil absorption below 25 g oil/100 g of pigment as determined by ASTM D281-12(2016).

The coating composition COA according to the invention may further comprise: up to 20 wt % preferably up to 15, 10 or 5 of isocyanate crosslinker; up to 20 wt %, preferably up to 5 wt % of a polyhydrazide cross linker; up to 10 wt % of a silane cross linker; up to 10% of an (meth-) acryloyl oligomer.

As mentioned earlier the coating compositions in accordance with the present invention are suitable for a variety of coatings uses, for example, as paint, impregnating, sealing and bonding compositions. A preferred application is as a primer, topcoat, or clear-coat. The coating compositions may be applied to a substrate in any convenient manner such as, for example, by brushing, spraying or dipping. Suitable substrates include metals, wood, board, plastics and leather.

The present invention also refers to a method of making a coating composition COA comprising the step of blending the aqueous vinyl polymer dispersion PD with at least one or more conventional ingredients selected from pigments, dyes, emulsifiers, surfactants, plasticizers, thickeners, heat stabilizers, levelling agents, anti-cratering agents, fillers, sedimentation inhibitors, UV absorbers, antioxidants, drier salts, organic co-solvents, wetting agents and the like, or mixtures thereof.

Preferably the coating composition COA is a waterborne coating composition.

The present invention also refers to a paint formulation comprising the coating composition COA or comprising the vinyl polymer dispersion PD. According to one embodiment the paint formulation is preferably a pigmented formulation.

The present invention also refers to the use of the aqueous vinyl polymer dispersion PD to increase the open-time, the wet-edge time and/or the hardness of a coating composition.

The present invention also refers to an article coated with the coating composition COA or with the paint formulation.

The invention will be explained in more detail by the following, non-limiting examples.

All the previous described embodiments may be combined within reason.

EXAMPLES

Test Methods

The solids content (SC) is measured by weighing 1 gram of dispersion in a tin-cup and, putting the cup into an air circulated oven for 60 minutes at 125° C. The difference in weight relates to the volatile content and the remaining non-volatile part is the solids content. If the viscosity is high, 1 gram of water is added before heating. If the polymer contains a co-solvent, the method described does not afford correct solids content values. As a consequence the theoretical solids content is used.

The molecular weight and molecular weight distribution was determined using size exclusion chromatography (SEC). The SEC apparatus used is an Alliance system consisting of a pump, auto-sampler and He-degasser (Degasys DG-1210 from Uniflows), equipped with a PLgel 5 μm MIXED-C 600×7.5 mm Column and a PLgel 5 μm guard column (50×7.5 mm—Polymer Laboratories). The Column oven (Separations Analytical Instruments) 5 was set at 30° C. Tetrahydrofuran (THF—Extra Dry, Biosolve 206347)+2% acetic acid (Baker 6052) is used as eluent at a flow-rate of 0.8 ml/min. Carbon disulfide (Backer) is used as a marker. A Waters 410 refractive index is used as detector. The injection Volume is 100 μl at a concentration of 1.5 mg/ml. Poly(styrene) standards (Polymer Laboratories, Easical PS-1, 2010-0501 (M range 580 g/mole-8,500,000 g/mole) and Easical PS-2, 2010-0601 (M range 580 g/mole— 400,000 g/mole)) were used for calibration using a third order polynomial. Software used for data-analysis is Empower (Waters). For the analysis of the molecular weight of polymer P2, the eluent is substituted for with hexafluoro isopropanol and the poly(styrene) standards by poly(methyl methacrylate) standards.

Brookfield viscosity is measured with a Brookfield RVT viscometer at a temperature of 23±1° C., according to ISO 2555-1974.

Particle size was determined by dynamic light scattering using a Malvern Zetasizer model Nano —S90. The Z-average value was reported as the particle size. The z-average diameter is the mean hydrodynamic diameter and is calculated according to the International Standard on dynamic light scattering ISO13321.

Early Water Resistance (EWR) is measured by applying a 80 μm wet film on Leneta plain charts. After drying for 24 hrs at 23° C. at 45-55% relative humidity droplets of water are put on the surface of the paint and left for 0.5, 1 and 2 hrs. After this time the water is removed with cloth. The damage in the form of blisters is judged directly and after 24 hrs recovery. The reported EWR is the one of 1 hr water contact and 24 hrs recovery. A scale of 1 (completely removed or fully blistered) to 5 (no damage) is used.

The open time of the paint was determined by applying it onto a Leneta plain chart FORM WH with a bar applicator at 125 microns in acclimatized conditions: at 23° C. at 45-55% relative humidity. The evaporation speed of the waterborne paints is 22 $mg/m^2/sec$. Using the rubber eraser of a pencil with a width of at least of 2 mm, X-shaped crosses are being applied into the paint layer immediately after it has been applied. A brush (Elma acryl 93-14 or Pro-Gold Exclusive 7200-12) loaded with fresh paint and the excess paint is removed by scraping alongside the edge of the can. The fresh loaded brush is moved twice in the vertical direction of the width of the substrate and twice in the horizontal direction of the length of the substrate at the location of the X-shaped cross. This movement is repeated 10 times on the same cross ("10 cross-brushes"). This procedure is repeated after a one or two-minute interval on the next cross, until the cross stays visible even after 10 "cross-brushes" (one movement=twice in the direction of the width of the substrate and twice in the direction of the length of the substrate). The open time is reported as the time in which the X-cross shape damage in the fresh applied film can be completely removed after 10 "cross-brushes" within the next interval of 1 or 2 minutes. 2 minutes intervals may be chosen to get a first indication of the open time; more accurate open time measure is followed by taking 1 minutes intervals.

König hardness was measured according to ASTM D 2457; 100 μm wet applied on glass, dried at room temperature and 16 h at 50° C.

Early blocking resistance was measured by applying the coating at a 150 μm wet layer thickness on a test chart. The coating is dried for 24 h at room temperature. Blocking is tested for 4 h at a temperature of 50° C., with a pressure of 1 kg/cm$^2$ according to ASTM D4946-89.

Example 1. Preparation of an Aqueous Dispersion of a Vinyl Polymer P1 by Means of Emulsion Polymerization In an emulsion polymerization reactor, equipped with a cooler, stirrer, monomer feed addition tank and initiator addition tank, a pre-emulsion was made as follows: 454 grams of water and 5 grams of an anionic polymerizable surfactant (Resoap® SR-1025) were added and heated to 70° C. In the feed tank a mixture of 117 grams of water, 22.8 grams of the anionic polymerizable surfactant Reasoap® SR-1025 (ex Adeka Corporation) and 0.3 grams of sodium lauryl sulfate were mixed for 5 minutes. The monomer pre-emulsion was prepared by adding the following raw materials in the feed tank: 109.5 grams of methyl methacrylate, 24.2 grams of Visiomer® ETMA (ethyl triglycol methacrylate, Rohm GmbH) 24.2 grams of methacrylic acid, 145.7 gram of n-butyl methacrylate, 3.56 octyl mercaptan and 1.75 grams of 2-mercapto ethanol. The contents of the feed tank were stirred until a stable pre-emulsion was obtained.

5% wt. of the pre-emulsion is dosed into the reactor. The reactor is heated to 80° C. When this temperature is reached, a solution of 0.3 grams of ammonium persulphate in 6.3 grams of water is added to the reactor. After waiting for 5 minutes, the reactor is heated to 85° C. The feeding of the pre-emulsified monomers to the reactor is started. Simultaneously, feeding of an initiator solution made-up of 0.75 grams of ammonium persulphate in 15.2 grams of water was started. The monomer feed dosing is completed in 60 minutes. The initiator feed dosing takes 70 minutes. The following finishing steps were performed: the feed tank was rinsed with 21.0 grams of water and the initiator tank with 6.7 grams of water. The temperature was maintained for another 60 minutes after the feed was completed. The batch was cooled to 65° C., and a slurry of 4.0 grams of water mixed with 0.75 grams of tertiarybutyl hydroperoxide (70% wt aq. solution) was added. A solution of 16.0 grams of water and 0.35 grams of sodium formaldehyde solfoxylate is dosed into the reactor over a period of 15 minutes period. The contents of the reactor were kept at a temperature of 65° C. for another 30 minutes. After this the reactor was cooled to 25° C. At a temperature of 25° C., a solution of 3.1 grams of Proxel® AQ (a 10% solution of benzoisothiazolone, ex Lonza) in 4.0 grams of water is added, the beaker is rinsed with 4.0 grams of water. A solution of 1.65 grams of 25 wt % ammonia solution in 4.0 grams of water is added to the reactor. The beaker is rinsed with 4.0 grams of water. An aqueous polymeric vinyl dispersion polymer having both ethylene oxide and carboxylic acid functionality was obtained with the following properties: SC=32%; pH=7.5; residual monomer <100 ppm; particle size=122 nm. The molecular weight was measured to be Mn=5,000 and Mw=13,200.

Example 2. Preparation of an Aqueous Solution of a Vinyl Polymer P2

In an polymerization reactor 930.80 grams of methyl ethyl ketone was added and heated to reflux (86° C.). Then a mixture of 31.90 grams of methyl ethyl ketone and 3.20 gram of the initiator Perkadox® AMBN (2,2'-azo bis(2-methylbutyronitril), ex Nouryon) was added in parallel with 1438.00 grams of (N)-vinyl pyrrolidone and 359.30 grams of ethyl acrylate to the reactor over a period of 3 hours. The reactor was held at reflux temperature for 30 minutes of post-reaction. The reactor was cooled down to 75° C. and 1237 grams of demineralized water was added. The methyl ethyl ketone distillation was started until the residual methyl ethyl ketone is <0.1%. Finally, additional water was added to reach the 50% theoretical solids content. The resulting second polymer was a clear solution with a slight haze and had a solids content of 49.7%. It had a weight average molecular weight of 51,300 and a number average molecular weight of 12,600 g/mol.

Example 3. Preparation of an Aqueous Dispersion of a Polymer P3

The initial step is the synthesis of a vinyl oligomer OL: A 7 liter reactor was charged with 3,089 grams of demineralized water and 35.44 grams of Reasoap® SR-1025. The reactor contents were heated to 80° C. while creating a nitrogen atmosphere in the reactor. The nitrogen atmosphere was maintained throughout the whole polymerization process. A pre-emulsion was prepared by dissolving 99.21 grams of Reasoap® SR-1020 in 779.8 grams of demineralized water. To this were added under stirring 1,297 grams of methyl methacrylate, 231 grams of diacetone acrylamide, 164.5 grams of methacrylic acid, 294.7 grams of n-butyl methacrylate, 22.1 grams of n-octyl mercaptan and 11.34 grams of 2-mercapto ethanol.

5% of this pre-emulsion was added to the reactor. When the temperature reached 80° C., 1.754 grams of ammonium persulphate, dissolved in 85.03 grams of demineralized water, were added to the reactor. The temperature was increased to 85° C. and the remainder of the pre-emulsion was dosed over a period of 60 minutes. The beaker that contained the pre-emulsion was rinsed with 177.2 grams of demineralized water. The beaker for the initiator solution was rinsed with 42.51 grams of water. The batch was held at 85° C. for 30 minutes after which 124.8 grams of ammonia (25% strength) dissolved in 255.3 grams of water were added over a period of 30 minutes. The pH of the solution was 8.2. The batch was held at 85° C. for another 120 minutes. After this hold period, the content of the reactor were cooled to room temperature. The product was filtered through a filter-bag and stored in a polyethylene recipient. Analysis showed that the crosslinkable oligomer had a number average molecular weight of 7,000 g/mole and a weight average molecular weight of 16,500 g/mole.

In the second step a vinyl polymer P4 was prepared in the presence of the vinyl oligomer described above. A 7 liter reactor was charged with 4.549 grams of the oligomer solution from the initial step and heated to 45° C. under stirring under a nitrogen atmosphere. A monomer mixture was prepared consisting of 391.3 grams of methyl methacrylate, 933.3 grams of n-butyl acrylate, 20.71 grams of divinyl benzene and 43.58 grams of Styrene. 50% of this mixture was added to the reactor. After mixing for 30 minutes, 0.59 grams of tertiary-butyl hydroperoxide (70% aqueous solution) were added, followed by 50% of a solution of 0.0382 grams of Iron(II)sulfate heptahydrate, 0.0478 grams of disodium ethylenediamine tetraacetate dehydrate in 58.16 grams of demineralized water. A solution of 2.533 grams of Bruggolite® FF6M (ex L. Brüggemann GmbH & Co. KG) in 290.5 grams of demineralized water was prepared and 43.95 grams of this solution was added to the reactor. The batch exothermed to 54.9° C. and is kept at 55° C. for 45 minutes. After the hold period, the reactor is cooled to 50° C. and the remainder of the monomers were added. The batch is kept at 50° C. for 30 minutes. The beaker that contained to monomer mixture is rinsed with 316.4 grams of demineralized water and this is added to the reactor. 2.46 grams of tertiary-butyl hydroperoxide (70% aqueous solution) and the remainder of the Iron(II)sulfate heptahydrate/disodium ethylenediamine solution was added to the reactor followed by 43.95 grams Bruggolite® FF6M solution. The batch exothermed to increase the temperature to 60° C. After 15 minutes, the remainder of the Bruggolite® FF6M solution was dosed into the reactor over a period of 30 minutes. Via an addition funnel, 64.63 grams of adipic dihydrazide was added. The funnel was rinsed with 316.4 grams of demineralized water. The batch was cooled to ambient temperature. To the reactor 21.31 grams of Proxel® AQ were added, followed by a rinse with 21.78 grams of demineralized water. The batch was filtered through a filter-bag and stored in a suitable recipient. The dispersion had a solids content of 39.8, a pH of 8.1, a Brookfield viscosity of 198 cPa.s and a particle size of 49 nm. The MFFT was 17° C.

Examples 4 and 5 (Comparative). Aqueous Coating Compositions

White pigmented coating formulations were made using the ingredients from Table 1.

Mill bases are prepared in a cooled vessel at room temperature. The vessel equipped with stirring equipment with a dissolver blade was loaded with, demineralized water, de-foamer, dispersant and surfactant. Subsequently the titanium dioxide is slowly added under high speed stirring (2,000-3,000 rpm, 50 mm disc size, diameter vessel 80 mm). After addition stirring is continued for 30 min. fineness of grind is below 10 µm.

Once the mill base is prepared then it is added to the binder (with the composition according to the invention) under stirring (1,000-1,500 rpm, 80 mm disc size, diameter vessel 150 mm) in the let-down vessel which is preloaded with the coating composition comprising the binders When ready the demi water, defoamer, anti-slip agent, co-solvents, amine, biocide, thickeners and again co-solvents are added under stirring.

After one night stabilization, extra thickener is added until ICI viscosity of 2.7-3.0 Poise (10,000 sec-1). The next day paints are applied for all testing.

TABLE 1

Pigmented coatings (amounts in grams)

| Component | example 4 | example 5 (comp.) | Function, supplier |
|---|---|---|---|
| Water | 42.4 | 42.4 | Solvent |
| Propylene glycol | 10.0 | 10.0 | Co-solvent |
| Disperbyk ® 190 | 11.4 | 11.4 | Wetting and dispersing agent, BYK Chemie |
| Byk ® 024 | 4.1 | 4.1 | Defoamer, BYK Chemie |
| Kronos ® 2190 | 189 | 189 | Pigment, Kronos |
| Dispersion from example 1 | 213.6 | | Binder |
| Resin solution from example 2 | 13.7 | 89.5 | Binder |
| Dispersion from example 3 | 369.5 | 507.3 | Binder |
| Dowanol ® DPM | 27 | 27 | Co-solvent, Dow Chemical |
| Water | 78.7 | 84.7 | Solvent |
| Surfynol ® 104 | 10 | 10 | Defoaming and wetting, Air Products |
| Byk ® 093 | 8.1 | 8.1 | Defoamer, BYK Chemie |
| ACRYSOL ™ RM-2020E | 22.5 | 22.5 | Thickener, Dow Chemical |

Table 2 shows the performance of the pigmented coating formulations presented in Table 1.

TABLE 2

Performance of paints

| | ex. 4 | ex. 5 (comp) |
|---|---|---|
| Brookfield Viscosity (6-60 rpm, mPa · s) | 2300-1870 | 3100-2000 |
| König hardness (s) | 55 | 61 |
| Flow (0 = bad, 5 = excellent) | 3-4 | 3-4 |
| Open time 1$^{st}$ layer (min) | 20 | 17 |
| Open time 2$^{nd}$ layer (min) | | |
| Operator 1 | 20 | 8 |
| Operator 2 | 18 | 8 |
| Operator 3 | 13 | 7 |
| Operator 4 | 18 | 6 |
| Operator 5 | 20 | 7 |
| Average open time second layer (min) | 17.8 | 7.2 |
| Early water resistance (0 = bad, 5 = excellent) | 3 | 3 |
| Early blocking (0 = bad, 5 = excellent) | 4 | 4 |

From table 2, it becomes clear that the coating composition according to the invention has a superior open time during the application of the second coating layer without detracting from the other coating properties.

The invention claimed is:

1. An aqueous vinyl polymer dispersion PD which comprises:

1) an aqueous dispersion of a vinyl polymer P1 obtained by free radical emulsion polymerization of a monomers mixture comprising:

a) 5 to 20 wt % acid functional ethylenically unsaturated monomers M1 or precursors thereof;

b) 5 to 25 wt % ethylenically unsaturated monomers M2 containing a polyethylene glycol or monoalkoxy polyethylene glycol moiety;

c) up to 90 wt % of non-ionic ethylenically unsaturated monomers M3 other than M1 or M2;

d) 0 to 10 wt % ethylenically unsaturated monomers M4 with a functional group for cross-linking after film-formation;

e) 0 to 10 wt % of at least one chain transfer agent CTA;

where the sum of the wt. % of M1+M2+M3+M4+CTA=100 wt %;

2) an aqueous dispersion or solution of a vinyl polymer P2 obtained by free radical copolymerization of:

a) from 25 to 95 wt % of a ethylenically unsaturated monomers M5 selected from the group of N-vinyl amides with general structure:

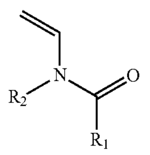

where $R_1$ and $R_2$ are alkyl from $C_1$ to $C_5$ and may be connected to form a ring-structure;

b) from 5 to 75 wt % of non-ionic ethylenically unsaturated monomers M3' other than M5 c) from 0 to 5 wt % of ethylenically unsaturated monomers M4' with a functional group for cross-linking after film-formation d) from 0 to 10 wt % acid functional ethylenically unsaturated monomers M1' or precursors thereof;

e) from 0 to 5 wt % of at least one chain transfer agent CTA';

where the sum of the wt. % of: M5+M3'+M4'+M1'+CTA'=100 wt %;

3) a film-forming vinyl polymer P3 in the form of an aqueous dispersion comprising:

i) from 20 to 60 wt % of a water-soluble or water dispersible crosslinkable vinyl oligomer OL obtained by emulsion polymerizing a monomer mixture comprising:

1) at least one acid functional ethylenically unsaturated monomer M1";

2) at least one ethylenically unsaturated monomer M4" with functionality for crosslinking upon film-formation, other than M1";

3) at least one ethylenically unsaturated monomer M3" other than M1" and M2", and 5) optionally, at least one chain transfer agent CTA", and ii) from 40 to 80 wt % of a high molecular weight vinyl polymer P4 prepared by emulsion polymerizing, in the presence of the water-soluble or water-dispersible crosslinkable vinyl oligomer OL, a monomer mixture comprising:

1) optionally one acid functional ethylenically unsaturated monomer M1'";

2) optionally one or more ethylenically unsaturated monomers M4'" with functionality for crosslinking upon film-formation, other than M1'";

3) at least one ethylenically unsaturated monomer M3'" other than M1'" and M2'" and 4) optionally, one or more multifunctional ethylenically unsaturated monomers for pre-crosslinking, M5'", wherein the high molecular weight vinyl polymer P4 has a weight average molecular weight of at least 60,000 g/mol, wherein the total weight of film-forming vinyl polymer P3=wt. % of the water-soluble or water dispersible crosslinkable vinyl oligomer OL+wt. % of the high molecular weight vinyl polymer P4=i)+ii)=100 wt % and wherein the total weight of the vinyl polymer in the aqueous vinyl polymer dispersion PD=wt. % of the vinyl polymer P1+wt. % of the vinyl polymer P2+wt. % of the film-forming vinyl polymer P3=100 wt %.

2. The aqueous vinyl dispersion PD according to claim 1, wherein the weight ratio of the vinyl polymers P1, P2 to P3 is comprised within the range of (1:1:98) to (65:15:20).

3. The aqueous vinyl polymer dispersion PD according to claim 1, wherein the vinyl polymer P1 has a number average molecular weight of from 2,000 to 120,000 g/mole as determined by size exclusion chromatography using tetrahydrofuran and 2% acetic acid as eluent and using polystyrene standards, an acid value of from 30 to 150 mg KOH/g as determined by ISO 3682 and from 5 to 25 wt % of ethylenically unsaturated monomers M2 which is selected from the group consisting of a polyethylene oxide and monoalkoxy polyethyleneglycol (meth)acrylates based on the total weight of the vinyl polymer P1.

4. The aqueous vinyl polymer dispersion PD according to claim 1, wherein the vinyl polymer P2 has a number average molecular weight Mn from 1,000 to 50,000 g/mole as determined by gel permeation chromatography using hexafluoro-iso-propanol as eluent and using polymethyl methacrylate standards for the calibration curve.

5. The aqueous vinyl polymer dispersion PD according to claim 1, wherein the vinyl polymer P2 comprises at least 80% of monomers M3', the monomers M3' present in the vinyl polymer P2 having a monomer glass transition temperature Tg lower than 120 °Celsius.

6. The aqueous vinyl polymer dispersion PD according to claim 1, wherein the vinyl polymer P2 is a copolymer of N-vinyl pyrrolidone and ethyl acrylate or a copolymer of N-vinyl caprolactam and ethyl acrylate.

7. The aqueous vinyl polymer dispersion PD according to claim 1, wherein the water-soluble or water dispersible crosslinkable vinyl oligomer OL has an acid value of at least 45 mg KOH/g.

8. The aqueous vinyl polymer dispersion PD according to claim 1, wherein the water-soluble or water dispersible crosslinkable vinyl oligomer OL has a number average molecular weight of from 500 to 50,000 g/mole as determined by size exclusion chromatography using tetrahydrofuran and 2% acetic acid as eluent and using polystyrene standards for the calibration curve.

9. The aqueous vinyl polymer dispersion PD according to claim 1, wherein the water-soluble or water dispersible crosslinkable vinyl oligomer OL has a glass transition temperature (Tg) within the range of 10 to 150° C.

10. The aqueous vinyl polymer dispersion PD according to claim 1, wherein the high molecular weight vinyl polymer P4 has a glass transition temperature between −70° C. and 50° C. and is at least 25° C. below the glass transition temperature of the water-soluble or water dispersible crosslinkable vinyl oligomer OL.

11. The aqueous vinyl polymer dispersion PD according to claim 1, wherein the high molecular weight vinyl polymer P4 has a number average molecular weight that is greater than or equal to 60,000 g/mole.

12. The aqueous vinyl polymer dispersion PD according to claim 1, wherein the film-forming vinyl polymer P3 is in the form of an aqueous polymer dispersion and comprises from 20 to 60 wt % of water-soluble or water dispersible crosslinkable vinyl oligomer OL.

13. The aqueous vinyl polymer dispersion PD according to claim 12, wherein the aqueous dispersion of vinyl polymer P3 has a solids content within the range of from 20 to 60 wt %.

14. A coating composition COA comprising the aqueous vinyl polymer dispersion PD according to claim 1 and at least one or more conventional ingredients selected from the group consisting of non-vinyl polymers, pigments, dyes, emulsifiers, surfactants, plasticizers, thickeners, heat stabilizers, levelling agents, anti-cratering agents, fillers, sedimentation inhibitors, UV absorbers, antioxidants, drier salts, organic co-solvents, and wetting agents.

15. A method of making a coating composition COA according to claim 14 comprising blending the aqueous vinyl polymer dispersion PD with at least one or more conventional ingredients selected from the group consisting of non-vinyl polymers, pigments, dyes, emulsifiers, surfactants, plasticizers, thickeners, heat stabilizers, levelling agents, anti-cratering agents, fillers, sedimentation inhibitors, UV absorbers, antioxidants, drier salts, organic co-solvents, and wetting agents.

16. The aqueous vinyl dispersion PD according to claim 1, wherein $R_1$ and $R_2$ are connected to form N-vinyl pyrrolidone or N-vinyl caprolactam.

17. The aqueous vinyl dispersion PD according to claim 1, wherein 3) the film-forming vinyl polymer P3 in the form of the aqueous dispersion comprises:

i) from 20 to 60 wt % of the water-soluble or water dispersible crosslinkable vinyl oligomer OL obtained by emulsion polymerizing the monomer mixture comprising:

1) at least one acid functional ethylenically unsaturated monomer M1";

2) at least one ethylenically unsaturated monomer M4" with functionality for crosslinking upon film-formation, other than M1";

3) at least one ethylenically unsaturated monomer M3" other than M1" and M2", and 5) optionally, at least one chain transfer agent CTA", and ii) from 40 to 80 wt % of the high molecular weight vinyl polymer P4 prepared by emulsion polymerizing, in the presence of the water-soluble or water-dispersible crosslinkable vinyl oligomer OL, the monomer mixture comprising:

1) optionally one acid functional ethylenically unsaturated monomer M1'";

2) optionally one or more ethylenically unsaturated monomers M4'" with functionality for crosslinking upon film-formation, other than M1'";

3) at least one ethylenically unsaturated monomer M3'" other than M1'" and M2'" and 4) optionally, one or more multifunctional ethylenically unsaturated monomers for pre-crosslinking, M5'" in an amount less than 5 wt %.

* * * * *